United States Patent [19]

Okajima

[11] Patent Number: 5,020,748

[45] Date of Patent: Jun. 4, 1991

[54] MOUNTING STRUCTURE FOR MOUNTING AN INSTRUMENT ON A SUPPORTING MEMBER OF A MOTOR VEHICLE

[75] Inventor: Tomoki Okajima, Kawagoe, Japan

[73] Assignee: Pioneer Electronic Corporation, Tokyo, Japan

[21] Appl. No.: 604,274

[22] Filed: Oct. 29, 1990

[30] Foreign Application Priority Data

Apr. 25, 1990 [JP] Japan ................... 2-111503

[51] Int. Cl.$^5$ ............................................. G12B 9/00
[52] U.S. Cl. ................... 248/27.1; 200/295; 361/419
[58] Field of Search ............ 248/551, 27.1, 27.3, 248/544, 906; 70/57, 58, 63, 432; 211/26; 174/48, 53; 312/7.1; 220/3.9; 361/419, 420, 422; 200/295, 296

[56] References Cited

U.S. PATENT DOCUMENTS

| | | | |
|---|---|---|---|
| 3,090,587 | 5/1963 | Peterson | 248/27.1 |
| 3,906,371 | 9/1975 | Tsuji | 361/422 X |
| 4,066,838 | 1/1978 | Fujita | 174/53 X |
| 4,177,498 | 12/1979 | Weitz | 200/296 |
| 4,226,393 | 10/1980 | Rardin | 220/3.9 X |
| 4,304,957 | 12/1981 | Slater | 174/58 X |
| 4,623,110 | 11/1986 | Kanari | 248/906 X |
| 4,687,172 | 8/1987 | Stillback | 248/551 |
| 4,732,281 | 3/1988 | Hall | 211/26 |
| 4,738,420 | 4/1988 | Angle | 312/7.1 X |
| 4,741,185 | 5/1988 | Weinet | 70/57 |
| 4,816,966 | 3/1989 | Frankowski | 200/295 |
| 4,830,316 | 5/1989 | Nehl | 248/27.1 |
| 4,868,715 | 9/1989 | Putman | 361/419 X |

FOREIGN PATENT DOCUMENTS

| | | | |
|---|---|---|---|
| 2802319 | 7/1979 | Fed. Rep. of Germany | 248/27.1 |
| 1-35505 | 10/1989 | Japan . | |

Primary Examiner—J. Franklin Foss
Attorney, Agent, or Firm—Armstrong, Nikaido, Marmelstein, Kubovcik & Murray

[57] ABSTRACT

A structure is provided for securing a casing of a car stereo on a periphery of an opening formed in a dashboard of a motor vehicle. A screw is rotatably supported in the casing by supporting members, and a movable member is engaged with the screw to be moved along the screw by rotating the screw. A clamping member is pivotally and axially movably mounted on the screw. When the movable member is moved, and engages with the clamping member, the clamping member is pivoted and axially moved. The clamping member has a clamping portion provided to be abutted on an inside wall of the dashboard when the clamping member is pivoted and axially moved, whereby clamping the dashboard.

2 Claims, 5 Drawing Sheets

MOUNTING STRUCTURE FOR MOUNTING AN INSTRUMENT ON A SUPPORTING MEMBER OF A MOTOR VEHICLE

BACKGROUND OF THE INVENTION

The present invention relates to a mounting structure for mounting an instrument such as a car stereo on a member of a motor vehicle, for example on a dashboard.

The operation for mounting the instrument on the dashboard must be performed at the front and rear sides of the dashboard, which requires much manual labor and time. A mounting structure to solve such a problem is disclosed in Japanese Utility Model Publication 1-35505, which is shown in FIGS. 8 and 9.

Referring to FIG. 8, reference numerals 9 and 11 designate supporting members formed on a casing of a car stereo and 12 is a nose portion of the car stereo. A crew 6 is rotatably supported on the supporting members 9 and 11. A movable member 1 is engaged with the screw 6, and a clamping member 3 is slidably mounted on the movable member The movable member is prevented from revolving about the screw 6 by a part of the casing, and the clamping member 3 is slidable only in the lateral direction, restricted by a stopper 2.

The casing of the car stereo is inserted in a dashboard and a projection 9a of the casing is abutted on a flange 8 of the dashboard 7. The clamping member 3 is moved with a tool 4 in the direction a (FIG. 9). Thereafter, the screw 6 is rotated with a hexagonal lever 5, so that the movable member 1 and the clamping member 3 are moved in the direction b of FIG. 9. As a result, a projection 3a of the clamping member 3 clamps the flange 8 together with the projection 9a to fix the casing of the stereo.

In the mounting structure, the manual operation of the tool 4 is considerably troublesome.

Japanese Utility Model Publication 63-22708 discloses a mounting structure eliminating the above described defect. FIG. 10 shows the mounting structure. A clamping member 3a is pivotally mounted on the movable member 1 by the pin 2. A spring 10 is attached to the screw 6 so as to urge a side of the clamping member 3 to an edge 9b of the supporting member 9. When the screw 6 is rotated with the lever 5, the movable member 1 is moved in the direction e. As the movable member 1 moves, the clamping member 3a is pivoted in the direction d by the spring 10. Finally, the clamping member 3a clamps the dashboard 7 as shown in FIG. 11.

In the structure of FIG. 10, the spring 10 is additionally mounted on the screw, which causes an increase of the member of parts of the structure. In addition, a space for the spring must be provided, so that the size of the stereo increases.

SUMMARY OF THE INVENTION

An object of the present invention is to provide a mounting structure which may easily and reliably mount an instrument on a supporting member of a motor vehicle.

Another object of the present invention is to provide a small mounting structure, whereby the instrument may be reduced in size.

According to the present invention, there is provided a mounting structure for securing a casing of an instrument on a periphery of an opening formed in a board member of a motor vehicle, comprising projections formed on the casing so as to abut on an outside of the periphery when the casing is inserted in an inside space behind the board member passing through the opening, a front side supporting member and a rear side supporting member formed on the casing, a screw rotatably supported in the casing by the supporting members, a movable member engaged with the screw and provided to be moved along the screw by rotating the screw, and a clamping member mounted on the screw.

The clamping member has an engaging portion disposed between the rear side supporting member and the movable member and axially slidably mounted on the screw and pivotably engaged thereon so that the clamping member may be pivoted in a plane including an axis of the screw, a clamping portion which is provided to be projected from the casing as the clamping member pivots in the plane, arms provided to be engaged with the movable member to cause an axial movement and pivoting of the clamping member, and clamping portion provided to be abutted on an inside wall of the board member when the clamping member is pivoted and axially moved. Thus, the board member is clamped by the clamping member and the projections.

In an aspect of the invention, a guide member is provided integrally with the rear side supporting member for guiding the clamping member so as to pivot it.

The other objects and features of this invention will become understood from the following description with reference to the accompanying drawings.

DETAILED DESCRIPTION OF THE PREFERRED EMBODIMENT

Figure 3:
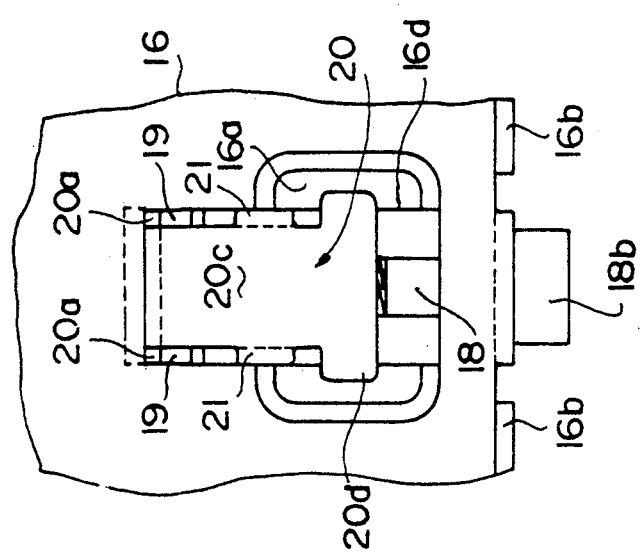
FIG. 3 is a left side view of the mounting structure.

Referring to FIGS. 1 to 5 showing a mounting structure for a car stereo according to the present invention, since the mounting structures are symmetrically provided in a casing of the car stereo, only the mounting structure on the left is described in the drawings.

Figure 1:
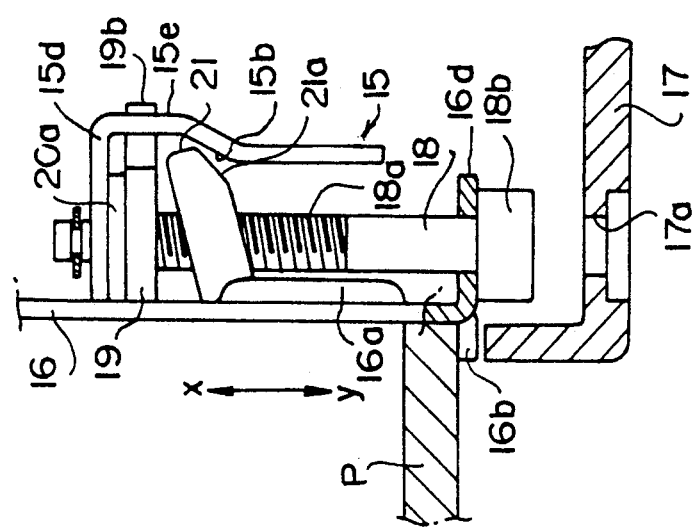
FIG. 1 is a plain view showing a mounting structure of a car stereo according to the present invention.

Referring to FIG. 1, a casing of a car stereo to be mounted in a dashboard panel P of a motor vehicle has a side plate 16, a guide member 15 secured to the side plate 16, and a nose portion 17 provided in front of the casing for covering the guide member 15. These members are secured to each other to form the casing.

Figure 2:
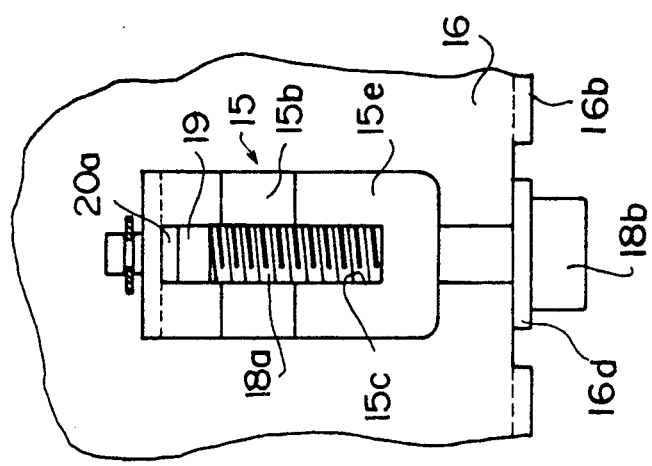
FIG. 2 is a right side view of the mounting structure.
Figure 5:
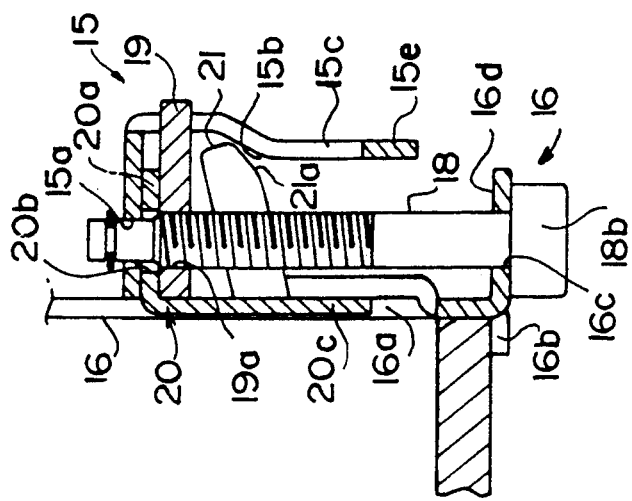
FIG. 5 is a sectional view of the mounting structure of FIG. 1.

The guide member 15 has an L-shaped section comprising a supporting portion 15d and a leg portion 15e. The supporting portion 15d is secured to the side plate 16 perpendicularly to the side plate 16 and has a hole 15a as shown in FIG. 5 for supporting a screw 18. The leg portion 15e is provided extending from the supporting portion 15d perpendicularly to the supporting portion 15d. The leg portion 15e has a slant portion 15b provided in a central portion thereof inclined toward the side plate 16 and an elongated guide slit 15c formed in the longitudinal direction thereof as shown in FIG. 2.

Figure 4:
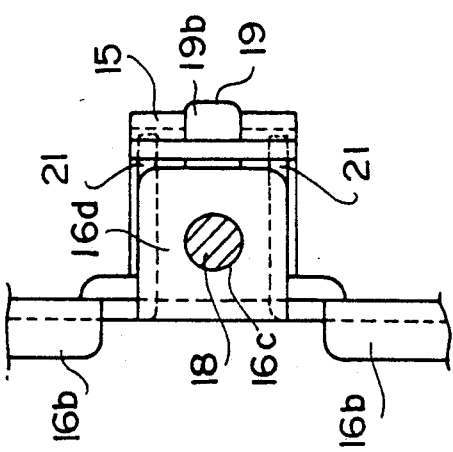
FIG. 4 is a front view of the mounting structure.

Referring to FIGS. 3 and 4, the side plate 16 has a recessed portion 16a formed in front of the leg portion 15e of the guide member 15 and an elongated opening 16d formed from the front side of the recessed portion 16a to the engaging portion of the guide member 15. The side plate 16 further has a pair of front bent portions outwardly bent to form engaging projections 16b which are engaged with the periphery of the dashboard panel P and an inner bent supporting portion 16d. A hole 16c is formed in the supporting portion 16d for supporting the screw 18.

The nose portion 17 has a hole 17a for inserting a hexagonal lever (now shown).

The screw 18 having a hexagon socket head is inserted into the hole 16c of the supporting portion 16d and into the hole 15a of the guide member 15 protruded from the hole 15a. The screw 18 has an annular groove formed at an end portion thereof to which an E-ring is secured for restricting the axial movement of the screw 18. Thus, the screw 18 is rotatably supported by the guide member 15. The screw 18 has a thread 18a formed on a part thereof on which a movable member 19 is engaged.

The movable member 19 has a threaded hole 19a to be engaged with the thread 18a and a sliding portion 19b slidably engaged with the guide slit 15c of the guide member 15. Thus, the movable member 19 is prevented from revolving. When the screw 18 is rotated by the hexagonal lever, the guide member 19 is slid in either direction shown by an arrow X or Y while the sliding portion 19b is slides on the inner guide walls of the guide slit 15c.

Referring to FIG. 5, a clamping member 20 is axially slidably mounted on the thread 18a of the screw 18 between the supporting portion 15d of the guide member 15 and the movable member 19. The clamping member 20 comprises an engaging portion 20a having a hole 20b loosely fitting the thread 18, a clamping portion 20c provided prependicularly extending from the engaging portion 20a. The diameter of the hole 20b is slightly larger than the external diameter of the thread 18a, so that the clamping member 20 may be pivoted in a plane including the axis of the screw 18. As shown in FIG. 3, the clamping portion 20c is slidably engaged with the elongated opening 16d of the side plate 16 and provided with opposite end projections 20d to be abutted on the outside wall of the recessed portions 16a.

Further, the clamping portion 20c is provided with a pair of projecting arms 21 extending from opposite sides thereof toward the movable member 19. Each arm 21 has a length to make a contact with the slant portion 15b of the guide member 15.

The operation for mounting the casing in the dashboard panel will be described hereinafter with reference to FIGS. 6a to 6d.

Figure 6A:
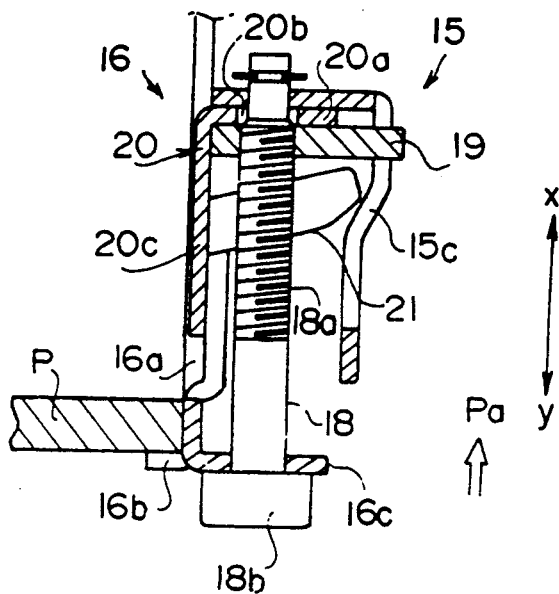
FIGS. 6a to 6d are explanatory sectional views showing mounting operation.

First, the end projections 20d (FIG. 3) of the clamping portion 20c of the clamping member 20 are abutted on recessed portion 16a of the side plate 16. In this state, the casing of the car stereo is inserted in an opening Pa formed in the dashboard panel P until the engaging projections 16b abut on the periphery of the dashboard panel P (FIG. 6a).

Figure 6B:
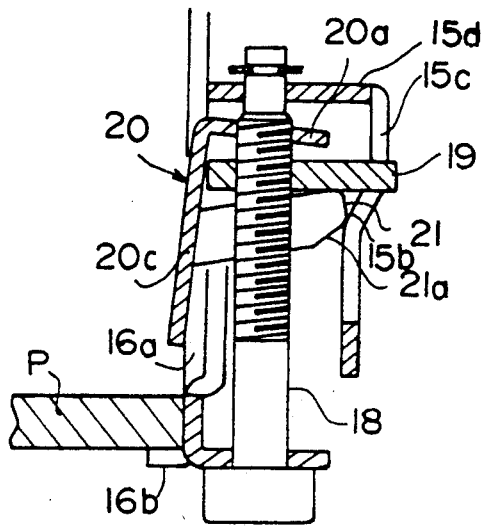
Figure 6C:
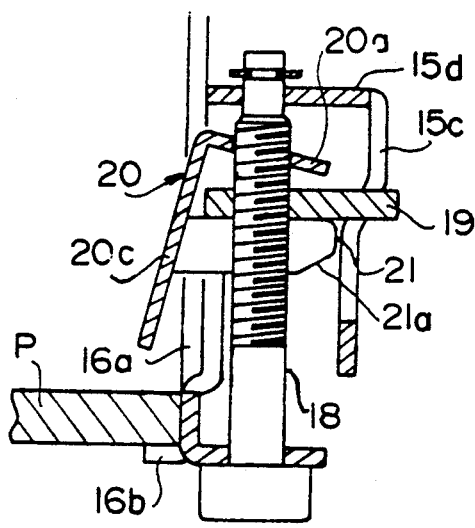

The screw 18 is rotated in the clockwise direction with the hexagonal lever engage with a hexagonal hole of the hexagon socket head 18b so that the movable member 19 is moved in the direction shown by the arrow Y, that is the forward direction. Thus, the movable member 19 abuts on the tip ends of the projecting arms 21 so that the arms 21 are pushed in the Y direction. Since the arms 21 are inclined toward the movable member 19 and contact with the slant portion 15b, the arms 21 are moved to the left and in the Y direction as shown in FIG. 6b.

When the arms 21 are deflected to the left, the clamping member 20 is swung in the clockwise direction about the hole 20b engaged with the screw 18 so that the clamping portion 20c is removed from the recessed portion 16a. The rotating angle of the clamping portion 20c becomes large corresponding to the moving amount of the movable member 19 in the Y direction.

When the movable member 19 is further moved in the Y direction, the movable member 19 abuts on the back side of each arm 21, where the arms 21 are parallel with the dashboard panel P.

Figure 6D:
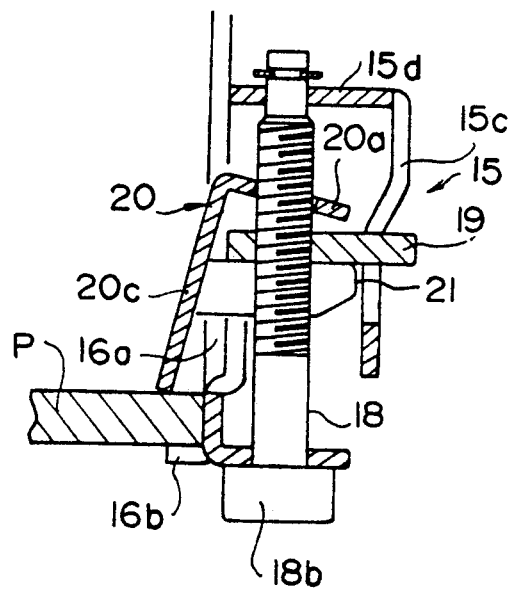

The clamping member 20 is moved in the Y direction in the state that the projecting end of the clamping portion 20c is projected from the recessed portions 16a of the side plate 16 (FIG. 6e). At last, the projecting end of the clamping member 20 abuts on the inside wall of the dashboard panel P. If the movable member 19 is further moved in the Y direction, the clamping member 20 clamps firmly the dashboard panel P together with the engaging projections 16b (FIG. 6d).

The force of the movable member 19 is uniformly exerted on the arms 21 so that the supporting force of the clamping portion 20c exerted on the dashboard panel P is ensured to provide a rigid clamping effect. After the car stereo is mounted in the dashboard panel, the hole 17a (FIG. 1) is covered by a plastic cover (not shown).

Figure 7A:
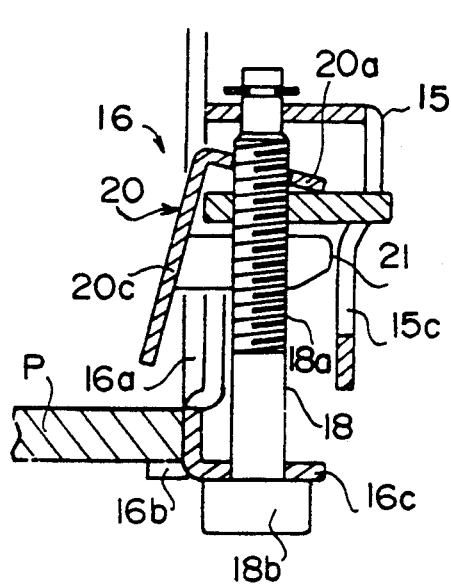
FIGS. 7a to 7d are explanatory sectional view showing removing operation.
Figure 7B:
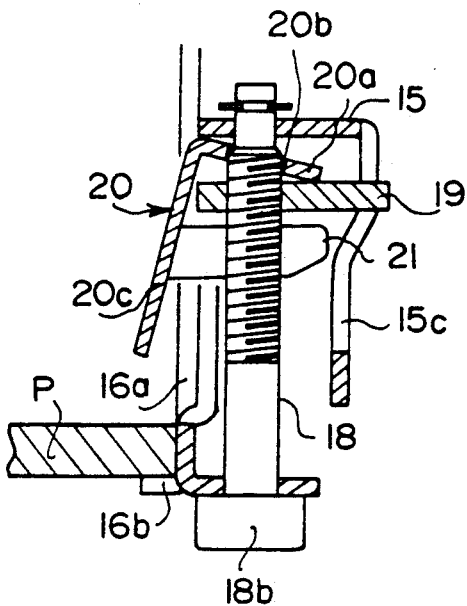
Figure 7C:
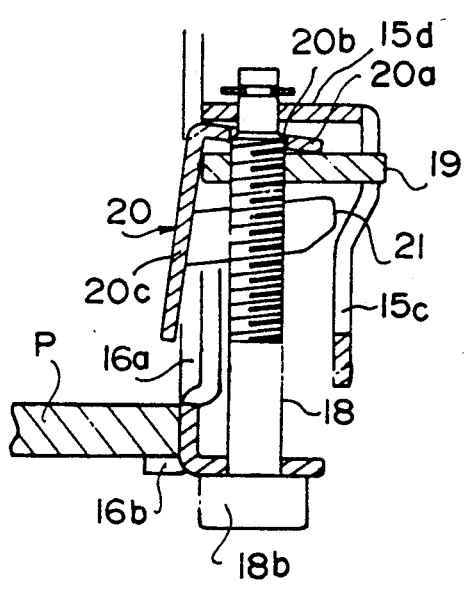
Figure 7D:
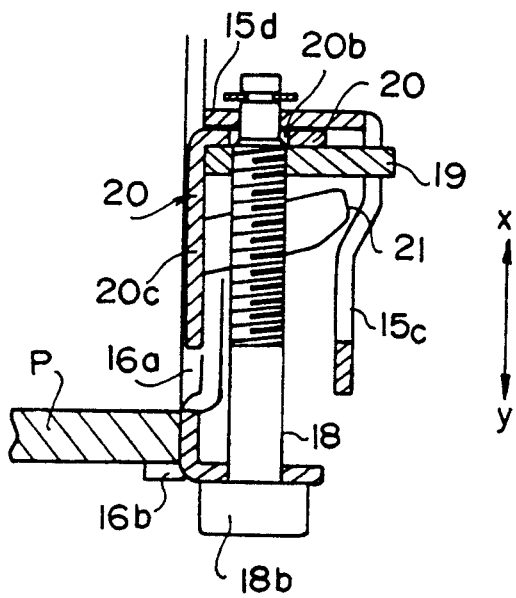
Figure 8:
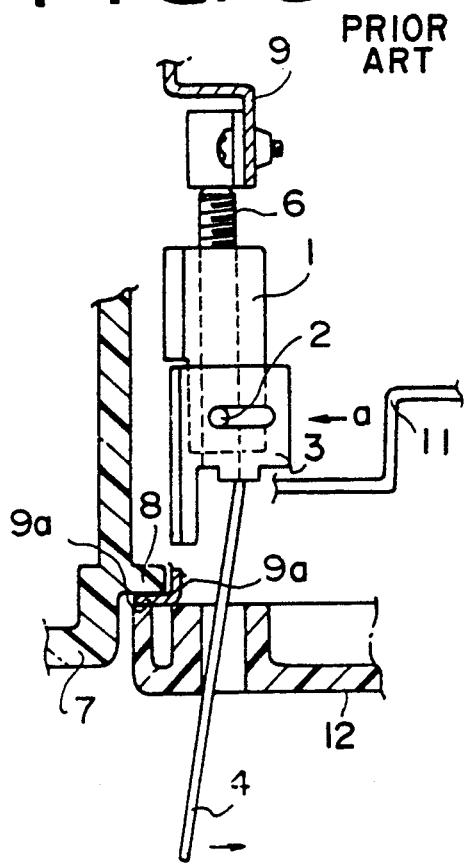
FIGs. 8 and 9 are sectional views showing a conventional mounting structure.
Figure 9:
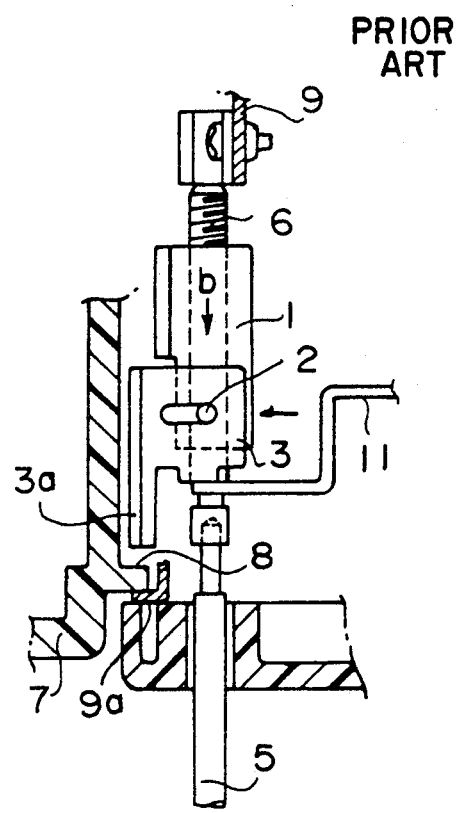
Figure 10:
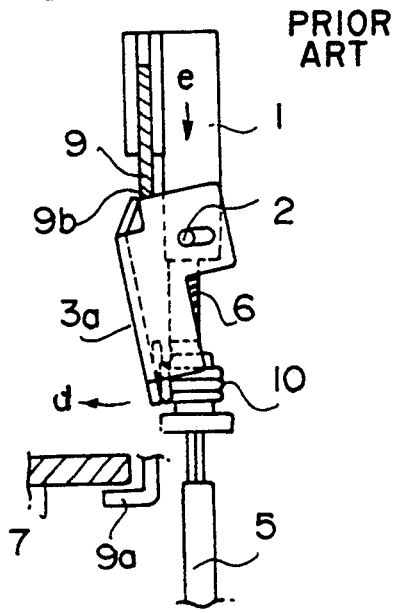
FIGS. 10 and 11 are sectional views showing another conventional mounting structure.
Figure 11:
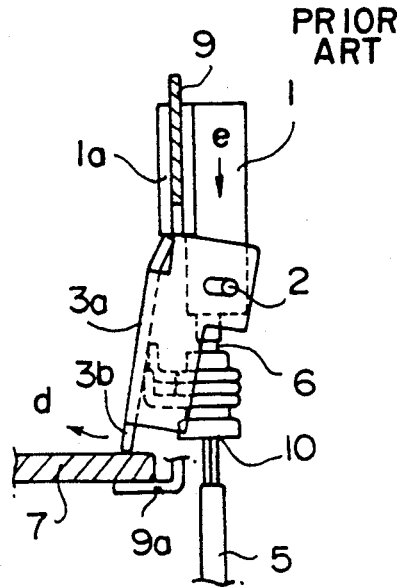

In order to remove the casing from the dashboard panel P, the screw 18 is rotated in the counterclockwise direction by the hexagonal lever. The movable member 19 is moved in the direction shown by the arrow X so that the movable member 19 abuts on the periphery of the engaging portion 20a to push the engaging portion 20a in the X direction (FIG. 7a). The movable member 19 is continuously moved in the X direction, the corner of the clamping member 20 abuts on the supporting portion 15d so that the movement of the clamping member 20 is restricted (FIG. 7b). If the movable member 19 is further moved in the X direction, the clamping member 20 is swung in the counterclockwise direction about the corner as a fulcrum. As a result, the engaging portion 20a is moved toward the supporting portion 15d of the guide member 15 to withdraw the clamping portion 20c (FIG. 7c).

Finally, the engaging portion 20a engages with the supporting portion 15d, and is supported by the movable member 19. The projections 20d of the clamping portion 20c engage with the recessed portions 16a (FIG. 6d). The casing can be pulled and released from the opening Pa of the dashboard panel P without inconvenience.

In accordance with the present invention, the casing of the car stereo is mounted on or removed from the dashboard panel by rotating the screw mounted in the casing. Thus, the mounting and removing operations of the casing are easily and ensurely performed at the front of the casing.

Since the casing is rigidly mounted on the dashboard panel with a large clamping force, the vibration of the car stereo in the casing caused by the vibration of the motor vehicle is reduced, thereby preventing damage of electronic parts of the car stereo.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A mounting structure for securing a casing of an instrument on a periphery of an opening formed in a board member of a motor vehicle, comprising:

projections formed on the casing so as to abut on an outside of said periphery when the casing is inserted in an inside space behind the board member passing through the opening;

a front side supporting member and a rear side supporting member formed on the casing;

a screw rotatably supported in the casing by said supporting members;

a movable member engaged with the screw and provided to be moved along the screw by rotating the screw; and a clamping member having an engaging portion disposed between said rear side supporting member and said movable member and axially slidably mounted on the screw and pivotably engaged thereon so that the clamping member may be pivoted in a plane including an axis of the screw, a clamping portion which is provided to be projected from the casing as the clamping member pivots in said plane, arms provided to be engaged with the movable member to cause an axial movement and pivoting of the clamping member, and clamping portion provided to be abutted on an inside wall of the board member when the clamping member is pivoted and axially moved, whereby clamping the board member together with said projections.

2. The mounting structure according to claim 1, further comprising a guide member integral with said rear side supporting member for guiding the clamping member so as to pivot it.

* * * * *